Jan. 27, 1959  R. G. PIETY  2,871,444
ELECTRICAL WELL LOGGING
Filed July 20, 1953  5 Sheets-Sheet 1

INVENTOR.
R. G. Piety
BY Hudson & Young
ATTORNEYS

Jan. 27, 1959  R. G. PIETY  2,871,444
ELECTRICAL WELL LOGGING
Filed July 20, 1953  5 Sheets-Sheet 2

INVENTOR.
R.G. Piety
BY Hudson & Young
ATTORNEYS

Jan. 27, 1959  R. G. PIETY  2,871,444
ELECTRICAL WELL LOGGING
Filed July 20, 1953  5 Sheets-Sheet 4

*Fig. 8.*

INVENTOR.
R. G. Piety
BY Hudson & Young
ATTORNEYS

INVENTOR.
R. G. Piety
BY Hudson & Young
ATTORNEYS

United States Patent Office 2,871,444
Patented Jan. 27, 1959

2,871,444

ELECTRICAL WELL LOGGING

Raymond G. Piety, Bartlesville, Okla., assignor to Phillips Petroleum Company, a corporation of Delaware Application July 20, 1953, Serial No. 368,906

20 Claims. (Cl. 324—1)

This invention relates to apparatus for determining electrical properties of earth formations penetrated by bore holes. In another aspect it relates to a method of and apparatus for transmitting information from a first location to a second location spaced therefrom.

In prospecting for oil it is desirable to obtain information regarding the geological strata penetrated by bore holes. One important property that can readily be measured to provide such information is the electrical resistivity of the various formations, and a number of systems are presently known which can be employed to make such determinations. For the most part these systems utilize one or more electrodes which are lowered into the bore hole in spaced relation. Sources of electrical energy and indicating equipment are positioned at the surface of the hole and connected to the electrodes by conductors contained within the cable which supports the electrodes. By slowly moving these electrodes through the bore hole it is possible to detect the boundaries of various formations and to determine the resistivity of the individual formations.

One of the simplest forms of such electrical logging equipment comprises a single electrode adapted to be lowered into the bore hole. A current source is connected between this electrode and a second reference electrode which can be positioned at the surface or within the bore hole at a spaced distance from the first electrode. The current flow between the two electrodes can be measured at the various depths to provide some indication of the resistivity of the formations adjacent the first mentioned electrode. Such a logging system is fairly reliable in detecting structural breaks corresponding to the various formations penetrated by the bore hole. However, this system suffers a serious drawback in that variations in the drilling mud filling the bore hole and the formation in the immediate vicinity of the moving electrode exercise undue effect on the measured readings because the total resistance between the electrodes is confined almost entirely to the immediate vicinity of the electrodes. While the drilling mud itself has a relatively uniform resistivity, such mud often invades porous formations so as to influence the resistivity thereof, Any changes of the diameter of the bore hole also influence the readings because of the varying quantity of drilling mud through which the measured current passes.

In order to obtain more reliable determinations of the actual resistivity of the formations the so-called "three electrode" system generally is employed. In such a system current is supplied to a single generating electrode and a pair of potential pickup electrodes are positioned in the bore hole in spaced relation with the generating electrode. This system operates on the principle that the current flow from the generating electrode is radially divergent in all directions for a substantial distance outward from the generating electrode. This results in an infinite number of concentric spherical equipotential surfaces surrounding the generating electrode. Potential differences existing between any two of these spherical surfaces can be detected by the pickup electrodes to provide a measurement of the potential gradient which is assumed to represent the potential gradient of the surrounding formation at a distance from the generating electrode equal to the distance between the generating electrode and the pair of pickup electrodes. From this measured potential gradient the resistivity of the formation can readily be calculated. Such resistivity measurements are thus actually measurements of the average resistivity of the formation and the fluid contained within the bore hole. Because of the differences in electrical resistivity of the driling mud and the surrounding formations, these measurements are at best only approximations. Another serious difficulty is that abrupt breaks in the formations result in ambiguous readings so that such a three-electrode system is useful only in determining resistivities of relative thick beds.

In accordance with the present invention there is provided an improved system for electrical well logging which comprises a plurality of current generating electrodes and a return electrode which is disposed in a single horizontal plane. The current flow from the generating electrodes to the pickup electrode therefore lies in a horizontal plane and the depth of penetration of this current flow into the surrounding formations is determined by the relative spacing of the generating and return electrodes. This entire logging electrode assembly is positioned at the midpiont of an elongated split guard ring electrode assembly which functions to maintain the current flow outward from the generating electrodes in substantially a horizontal plane. By the use of a plurality of generating electrodes separate current flows are realized at various depths of penetration, thus enabling resistivity determinations to be made of formations positioned sufficiently distant from the bore hole as not to be invaded by the drilling mud. Such a system also enables the depth of invasion of the drilling mud into the formations to be determined.

Another serious problem which has existed heretofore in electrical well logging has been the difficulty of transmitting information obtained from within the bore hole to suitable surface indicating equipment over a minimum number of electrical conductors. Since a plurality of electrodes often are used in making measurements it is necessary that a plurality of electrical signals be transmitted to the surface. For economy and simplicity of operation it is necessary that the connecting cable contain a minimum number of conductors, especially when measurements are made in deep wells.

In accordance with the present invention an improved telemetering system is provided whereby a plurality of signals can be transmitted from a first location to a second location spaced therefrom over a minimum number of electrical conductors. This system comprises generally a plurality of saturable magnetic core reactors, one for each signal being transmitted. The output of an oscillator which includes multiple harmonics is applied to the exciter windings of each of the reactors, and the individual electrical signals to be transmitted are applied to the control windings of the respective reactors. The output windings of the reactors are applied to the inputs of respective tuned amplifiers which are adapted to pass signals corresponding to respective harmonics of the oscillator output. The outputs of the several amplifiers are transmitted to the surface over a single pair of conductors. The transmitted signal is then demodulated at the surface by a plurality of rectifiers and associated filter circuits which transmit the respective harmonics of the oscillator output. The outputs of the surface filter circuits thus provide an indication of the magnitude of signal applied to the control windings of the various reactors.

Accordingly it is an object of the present invention to provide improved electrical apparatus for logging bore holes.

Another object is to provide an electrical system which is capable of indicating both the boundaries between adjacent formations and the resistivity of the individual formations.

A further object is to provide an electrical logging system for determining the lateral depth of penetration of well bore hole fluid into the formations surrounding a bore hole.

A still further object is to provide a method of and apparatus for transmitting information from a bore hole to the surface thereof over a minimum number of electrical conductors.

Various other objects, advantages and features of this invention should become apparent from the following detailed description of a preferred embodiment thereof in which.

Figures 1, 2:
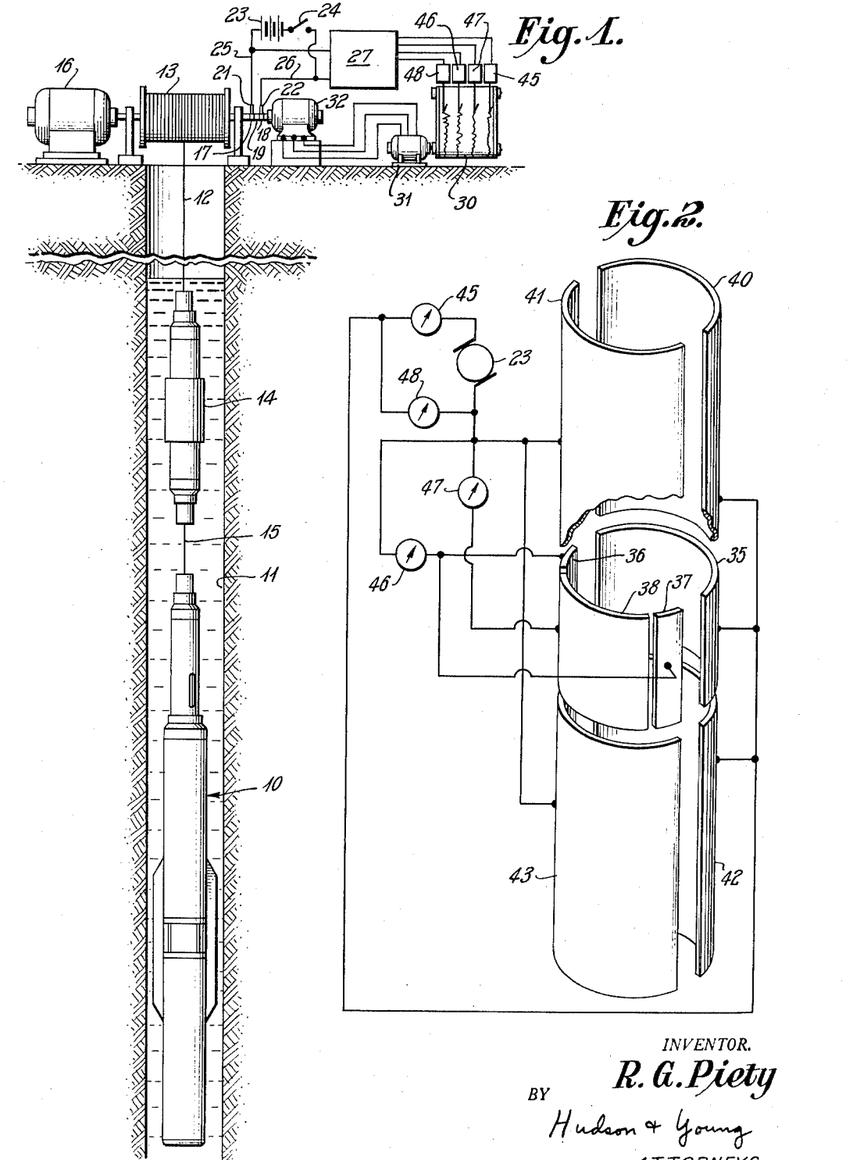
Figure 1 illustrates the well logging apparatus of this invention suspended within a bore hole and the associated surface equipment.
Figure 2 is a schematic view of the electrode assembly and electrical circuitry connected thereto.

Referring now to the drawing in detail and to Figure 1 in particular, there is illustrated an electrode assembly 10 which is suspended within a bore hole 11 by means of a cable 12 which is attached at its upper end to a motivated reel 13. A housing 14 which contains the various electrical components associated with electrode assembly 10 is attached to cable 12 at a position above assembly 10 and a cable 15 connects assembly 10 with housing 14. Reel 13, which is driven by a motor 16, serves to raise and lower the downhole assembly within bore hole 11. Cable 12 contains a pair of electrical conductors, not shown in Figure 1, which terminate in respective slip rings 17 and 18 mounted on drive shaft 19 of reel 13. Brushes 21 and 22 engage respective slip rings 17 and 18 and a current source 23 is connected across brushes 21 and 22 through a switch 24. Conductors 25 and 26 connect respective brushes 21 and 22 to a housing 27 which contains the surface electrical circuitry associated with the downhole logging apparatus. The several current and potential measurements which are described in greater detail hereinafter are recorded on a chart 30 which is driven by a synchros-motor 31. Motor 31 is rotated by a synchros-generator 32 which in turn is rotated by reel shaft 19 such that chart 30 is positioned in accordance with the depth at which the electrode assembly 10 is suspended within bore hole 11. It is of course apparent that other known mechanism can be employed in place of motors 31 and 32 to position chart 30 in accordance with the depth to which the assembly is lowered.

Electrode assembly 10 is illustrated in a schematic manner in Figure 2. The midsection of this assembly comprises a semicircular electrode 35 which is opposed by three electrodes 36, 37 and 38 which together form a semicircular configuration. A pair of opposing elongated semicircular electrodes 40 and 41 are positioned above electrodes 35, 36, 37 and 38 and a pair of semicircular, elongated opposing electrodes 42 and 43 are positioned below electrodes 35, 36, 37 and 38. Electrodes 35, 40 and 42 are electrically connected to one another and to one terminal of a current source 23 through a current meter 45. The second terminal of current source 23 is connected directly to electrodes 41 and 43, to electrodes 36 and 37 through a current meter 46 and to electrode 38 through a current meter 47. A voltmeter 48 is connected between the second terminal of current source 23 and electrodes 35, 40 and 42. It should thus be apparent that a plurality of current paths are provided. The first of these paths can be traced from current source 23 to electrode 41, thence to electrode 40 through the surrounding earth formations and finally back to source 23. The second flow path can be traced in like manner from source 23 to electrode 43, thence to electrode 42 and finally back to source 23. The third current path is from source 23 to electrode 38, thence to electrode 35 through the surrounding earth formations and finally back to source 23. The final two current paths are from source 23 to respective electrodes 36 and 37, thence to common electrode 35 through the surrounding earth formations and finally back to source 23. Electrodes 41, 36, 37, 38 and 43 are maintained at a first common potential whereas electrodes 40, 35, and 42 are maintained at a second common potential, these first and second potentials representing the potentials at the two terminals of source 23. In actual construction upper electrodes 40 and 41 and lower electrodes 42 and 43 are considerably longer than center electrodes 35, 36, 37 and 38. As a specific example the upper and lower electrodes can each be approximately six feet long while the center electrodes are each approximately three inches long. In this manner the upper and lower electrodes function as a split guard ring to maintain the current flow between the center electrodes in substantially a horizontal path through the surrounding earth formations.

Figure 3:
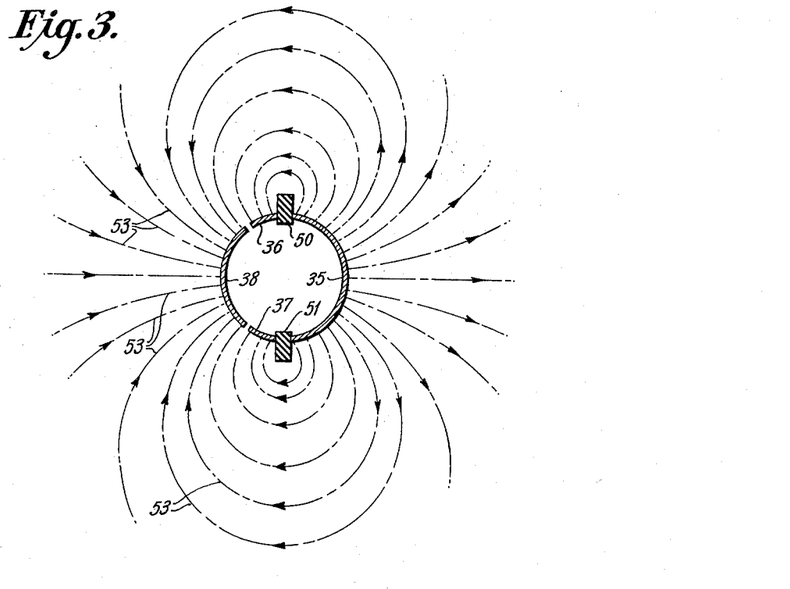
Figure 3 is a schematic view of idealized current flow in a horizontal plane between the segmented current electrode and associated return electrode.
Figures 4, 5, 6, 7:
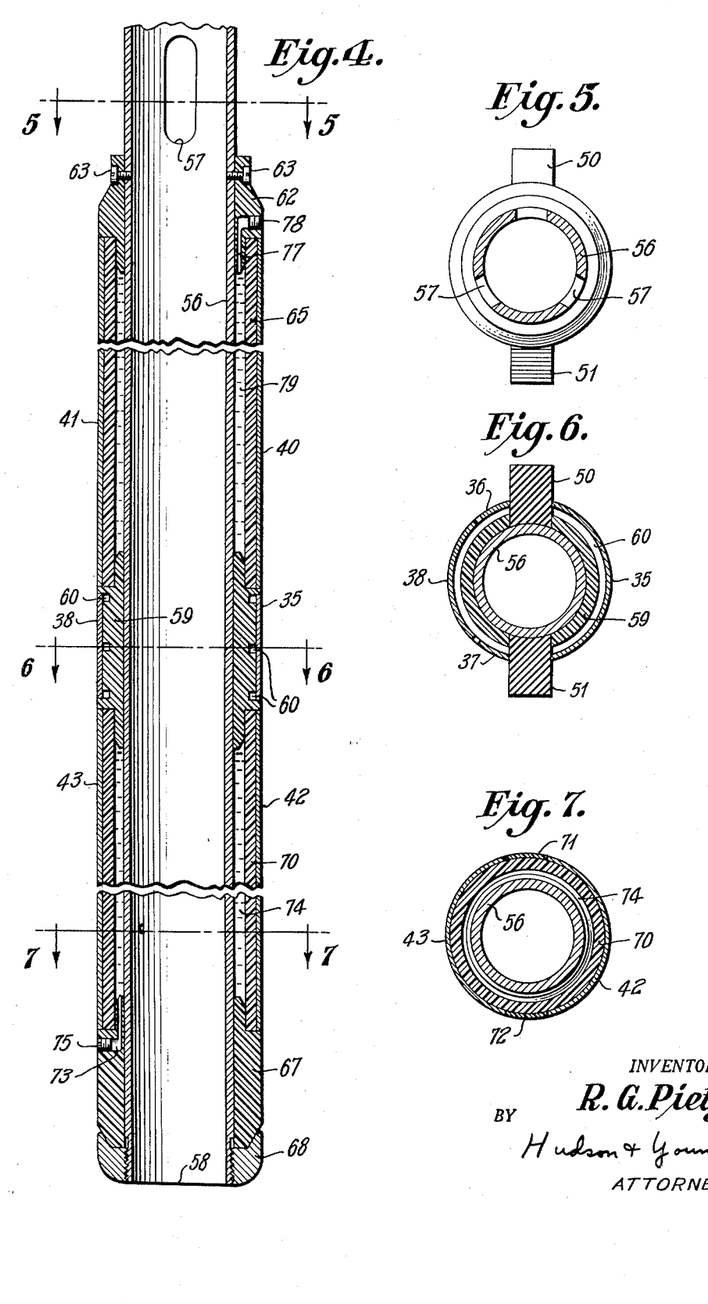
Figure 4 is a vertical sectional view illustrating detailed construction of the electrode assembly.
Figure 5 is a sectional view taken along line 5—5 in Figure 4.
Figure 6 is a sectional view taken along line 6—6 in Figure 4.
Figure 7 is a sectional view taken along line 7—7 in Figure 4.

This horizontal current flow between the center electrodes is illustrated schematically in Figure 3. A first fin 50 of electrically insulating material is positioned between electrodes 35 and 36 and a second fin 51 of electrically insulating material is positioned between electrodes 35 and 37. Fins 50 and 51 extend outwardly from the electrode assembly in close proximity to the walls of the bore hole. These fins serve the dual purposes of centering the assembly in the bore hole and forcing the current flow between the center electrodes to take a path substantially through the surrounding earth formations rather than through the drilling mud surrounding the electrodes. The center portion of the electrode assembly contains an annular core, not shown in Figure 3, of electrically insulating material which prevents current flow between the electrodes through the interior of the assembly. Each of electrodes 36, 37 and 38 is maintained at a common potential with respect to electrode 35 so that if the surrounding earth formation is entirely homogeneous the current flow between electrode 35 and electrodes 36, 37 and 38 is somewhat as indicated by flow lines 53. Under these conditions each individual line of current flow will leave electrode 35 at a point symmetrical with respect to fins 50 and 51 from which it enters one of the electrodes 36, 37 and 38. However, in actual practice there normally exists a perturbing effect due to the annular regions of different resistivity surrounding the bore hole, and further the current flow lines adjacent fins 50 and 51 normally are short-circuited somewhat if the drilling mud has a lower resistivity than the surrounding earth formations. The current flow lines that penetrate the earth formations to an intermediate depth measure the resistivity of the formation in which some drilling mud has invaded if the formation is porous. The current flow lines that enter electrode 38 near its midpoint penetrate the deepest into the surrounding earth formations and thus provide a measurement of the true resistivity of the formations. The current flow to electrode 36 normally is substantially equal to the current flow to electrode 37 if the two electrodes are of equal size and in practice these two electrodes are electrically connected to measure the total current flow to both.

Details of construction of a preferred embodiment of the electrode assembly are illustrated in Figures 4, 5, 6 and 7. The entire assembly is mounted on an elongated cylindrical metallic core member 56 which has an opening 58 at the bottom and which is provided with a plurality of openings 57 near the top. The bottom opening 58 and top openings 57 thus allow drilling mud to pass through the interior of core 56 as the assembly is raised and lowered in bore hole 11. An annular electrically insulating support member 59 is mounted on core 56 near the midpoint thereof. The four center electrodes 35, 36, 37 and 38 are mounted on support member 59 in the relative spaced positions illustrated in Figures 2, 3 and 6. A plurality of slots 60 are formed in support member 59 so that the various electrical leads, not shown in Figure 4, can pass from electrodes 35, 36, 37 and 38 to the interior of core 56 and thence upward to container 14 which houses the electrical components of the downhole telemetering system. A second annular support member 62 is mounted on core 56 near its upper end by a plurality of set screws 63. A first elongated cylindrical electrically insulating core member 65 is mounted outside core 56 in spaced relation therewith and is supported at its two ends by respective supports 59 and 62. Electrodes 40 and 41 are mounted on core 65 and separated by a pair of insulating strips, not shown. A third annular support member 67 is mounted on core 56 near its lower end and is held in place by a cap 68 which is threaded to the lower end of central core 56. A second elongated cylindrical electrically insulating core member 70 is positioned about core 56 in spaced relation therewith and supported at its two ends by respective supports 59 and 67. Electrodes 42 and 43 are mounted on core 70 and are separated by a pair of insulating strips 71 and 72, illustrated in Figure 7, which are identical to the strips separating electrodes 40 and 41. A small passage 73 is formed in support member 67 so as to communicate between the region 74 between cores 56 and 70 and the outside of the electrode assembly. A plug 75 is fitted in passage 73 to allow region 74 to be filled with an insulating liquid such as oil to resist the external bore hole pressure. A similar passage 77 is formed in support member 62 and a plug 78 fitted therein allows the region 79 between cores 56 and 65 to be filled with a liquid. Electrode assembly 10 is attached to housing 14 by cable 15 which encloses the various electrical leads that connect the electrodes of assembly 10 to the associated circuit components which are described hereinafter.

Figure 8:
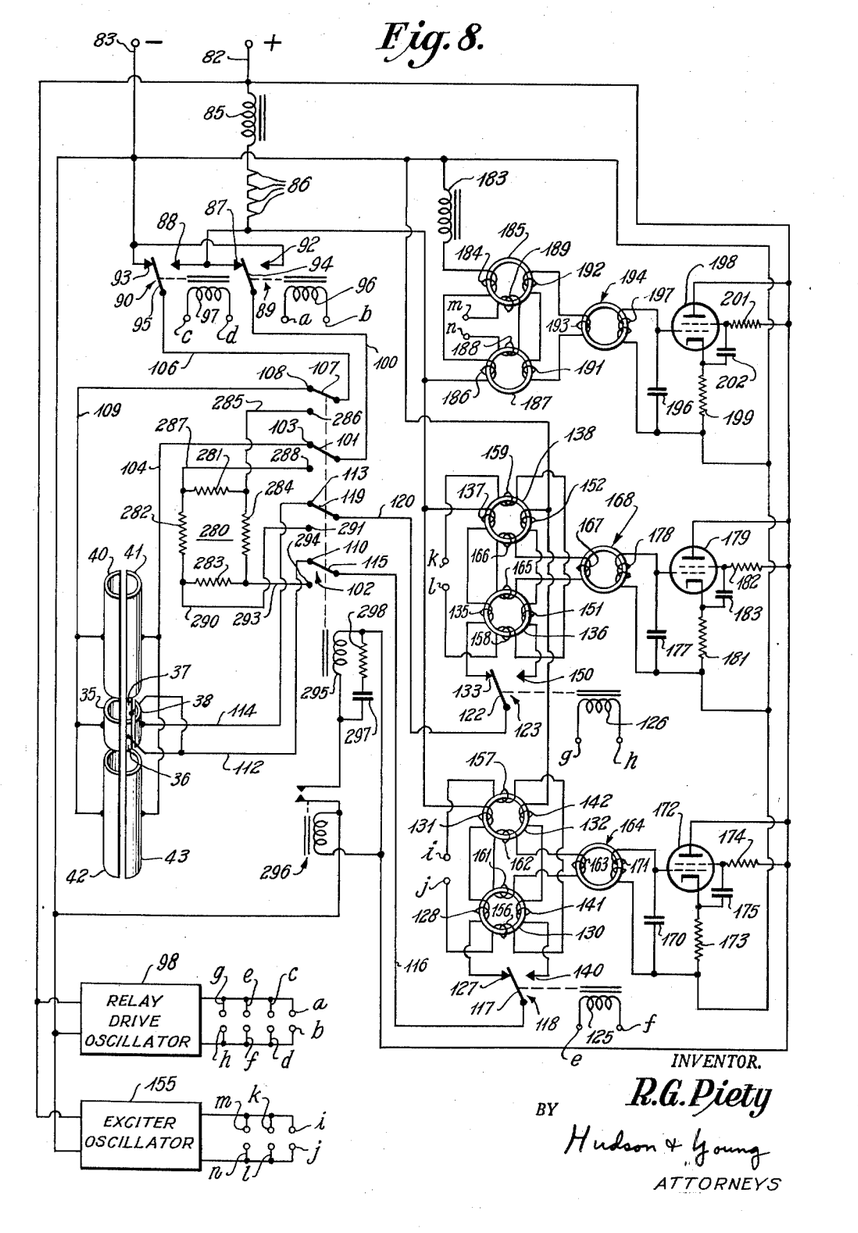
Figure 8 is a schematic diagram of the complete downhole electrical circuitry associated with the electrode assembly.

The downhole circuit components associated with assembly 10 are illustrated in detail in Figure 8. The entire downhole apparatus is energized by a direct voltage current source 23 positioned at the surface and connected to conductors 82 and 83 contained within cable 12. Conductor 82, which is connected to the positive terminal of current source 22, is connected through an inductor 85 and a plurality of vacuum tube filament coils 86 to the first terminals 87 and 88 of respective relay operated switches 89 and 90. Conductor 83, which is connected to the negative terminal of current source 23 is connected to the second terminals 92 and 93 of respective switches 89 and 90. The movable contact arms 94 and 95 of respective switches 89 and 90 are driven by respective relay coils 96 and 97 which are energized by a relay drive oscillator 98 at a predetermined frequency. Output terminals $a$ and $b$ of oscillator 98 are connected across relay coil 96 and output terminals $c$ and $d$ of oscillator 98 are connected across relay coil 97. Switch arm 94 is connected by a lead 100 to a first switch arm 101 of a four element relay operated switch 102. Switch 102 normally is biased in the illustrated upward position such that arm 101 remains in contact with a switch terminal 103 which in turn is connected by a lead 104 to electrodes 41 and 43. Switch arm 95 is connected by a lead 106 to a second switch arm 107 of switch 102. Switch arm 107 normally engages a terminal 108 which is connected by a lead 109 to electrodes 40, 35 and 42. Electrodes 36 and 37 are electrically connected to one another and to an up position terminal 110 of switch 102 by a lead 112. Electrode 38 is connected to an up position terminal 113 of switch 102 by a lead 114. Switch arm 115 normally engages contact 110 and is connected by lead 116 to the switch arm 117 of a relay operated switch 118. A switch arm 119 normally engages terminal 113 and is connected by a lead 120 to the switch arm 122 of a relay operated switch 123.

Switches 118 and 123 are energized by respective relay coils 125 and 126 which in turn are energized by oscillator 98. A third pair of output terminals $e$ and $f$ of oscillator 98 are connected across relay coil 125 and a fourth pair of output terminals $g$ and $h$ of oscillator 98 are connected across relay coil 126. In its first position switch arm 117 engages a terminal 127 which in turn is connected to the first terminal of a winding 128 on a saturable core reactor 130. The second terminal of winding 128 is connected to the first terminal of a winding 131 on a second saturable core reactor 132 and the second terminal of winding 131 is connected directly to terminals 87 and 88 of respective switches 89 and 90. The corresponding first terminal 133 of switch 123 is connected to the first terminal of a winding 135 on a saturable core reactor 136. The second terminal of winding 135 is connected to the first terminal of a winding 137 on a saturable core reactor 138 and the second terminal of winding 137 also is connected directly to terminals 87 and 88 of respective switches 89 and 90. The second terminal 140 of switch 118 is connected to the first terminal of a winding 141 on reactor 130. The second terminal of winding 141 is connected to the first terminal of a winding 142 on core 132 and the second terminal of winding 142 is connected directly to terminals 92 and 93 of respective switches 89 and 90. The second terminal 150 of switch 123 is connected to the first terminal of a winding 151 on reactor 136. The second terminal of winding 151 is connected to the first terminal of a winding 152 on reactor 138 and the second terminal of winding 152 is connected directly to terminals 92 and 93 of respective switches 89 and 90.

A source of alternating exciter current for the various reactors is provided by an oscillator 155. A winding 156 on reactor 130 is connected in series relation with a winding 157 on reactor 132 and a first pair of output terminals $i$ and $j$ of oscillator 155. A winding 158 on reactor 136 is connected in series relation with a winding 159 on reactor 138 and a second pair of output terminals $k$ and $l$ of oscillator 155. An output winding 161 on reactor 130 is connected in series relation with an output winding 162 on reactor 132 and the primary winding 163 of a transformer 164. An output winding 165 on reactor 136 is connected in series relation with an output winding 166 on reactor 138 and the primary winding 167 of a transformer 168. A capacitor 170 is connected in shunt with the secondary winding 171 of transformer 164 to form a tuned circuit having the terminals thereof connected, respectively, to the control grid of a vacuum tube tetrode 172 and to the cathode thereof through a cathode resistor 173. The anode of tube 172 is connected to positive conductor 82 and the cathode of tube 172 is connected to negative conductor 83 through cathode resistor 173.

The screen grid of tube 172 is connected to conductor 82 through a resistor 174 and to the cathode of tube 172 through a capacitor 175. A capacitor 177 is connected in shunt with the secondary winding 178 of transformer 168 to form a tuned circuit having the terminals thereof connected, respectively, to the control grid of a vacuum tube tetrode 179 and to the cathode thereof through a cathode resistor 181. The anode of tube 179 is connected to positive conductor 82 and the cathode of tube 179 is connected to negative conductor 83 through cathode resistor 181. The screen grid of tube 179 is connected to conductor 82 through a resistor 182 and to the cathode of tube 179 through a capacitor 183.

As will be more fully explained hereinafter the two reactor circuits thus far described are employed to measure the relative current flow between electrode 38 and electrode 35 and between electrodes 36, 37 and electrode 35. A third saturable core reactor circuit is employed to measure the potential difference across the opposing electrodes. To this end terminals 92 and 93 of respective switches 89 and 90 are connected to respective terminals 87 and 88 of switches 89 and 90 through an inductor 183 connected in series relation with a winding 184 on a saturable core reactor 185 and a winding 186 on a saturable core reactor 187. An exciter winding 188 on reactor 187 is connected in series with an exciter winding 189 on reactor 185 and a third pair of output terminals $m$ and $n$ of oscillator 155. An output winding 191 on reactor 187 is connected in series relation with an output winding 192 on reactor 185 and the primary winding 193 of a transformer 194. A capacitor 196 is connected in shunt with the secondary winding 197 of transformer 194 to form a tuned circuit having the terminals thereof connected, respectively, to the control grid of a vacuum tube tetrode 198 and to the cathode thereof through a resistor 199. The anode of tube 198 is connected to positive conductor 82 and the cathode of tube 198 is connected to negative conductor 83 through cathode resistor 199. The screen grid of tube 198 is connected to conductor 82 through a resistor 201 and to the cathode of tube 198 through a capacitor 202.

Figure 9:
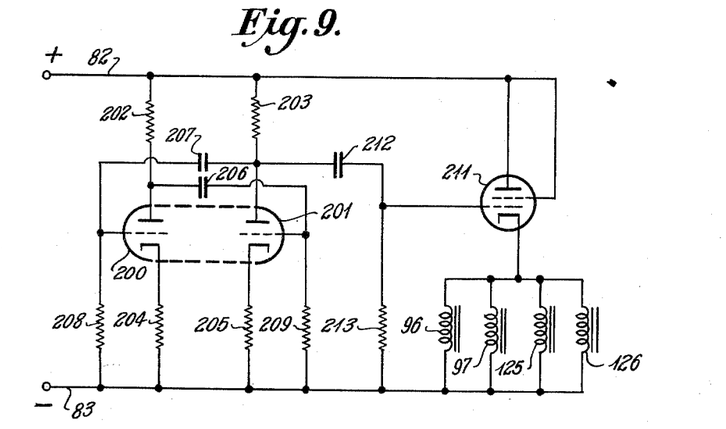
Figure 9 is a schematic circuit diagram of the oscillator employed to drive the various switching relays.

Relay drive oscillator 98 which is employed to actuate switches 89, 90, 118 and 123 is illustrated in detail in Figure 9. This oscillator comprises a pair of vacuum tube triodes 200 and 201, the anodes of which are connected to positive conductor 82 through respective anode resistors 202 and 203. The cathodes of triodes 200 and 201 are connected to negative conductor 83 through respective cathode resistors 204 and 205. The anode of triode 200 is connected to the control grid of triode 201 through a capacitor 206, and the anode of triode 201 is connected to the control grid of triode 200 through a capacitor 207. Resistors 208 and 209 are connected between the control grids of respective triodes 200 and 201 and conductor 83. The anode of triode 201 is connected to the control grid of an output amplifying vacuum tube tetrode 211 through a capacitor 212, and a resistor 213 is connected between the control grid of tetrode 211 and conductor 83. The anode and screen grid of tetrode 211 are connected to conductor 82. Relay coils 96, 97, 125 and 126 are connected in parallel relation with one another between the cathode of tetrode 211 and negative conductor 83. In one specific example of this invention the circuit components of the oscillator illustrated are proportioned such that the frequency of oscillations is of the order of 15 cycles per second. However, it should be apparent that other switching frequencies can be employed if desired.

Figure 10:
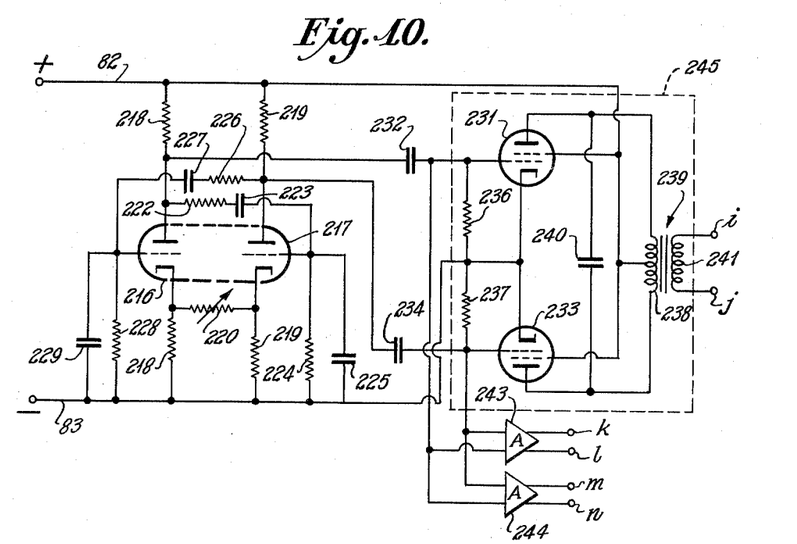
Figure 10 is a schematic circuit diagram of the oscillator adapted to provide exciter current for the saturable core reactors.

Exciter oscillator 155 which energizes the various saturable core reactors of Figure 8 is illustrated in detail in Figure 10. This oscillator also comprises a pair of vacuum tube triodes 216 and 217, the anodes of which are connected to positive conductor 82 through respective anode resistors 218 and 219. The cathodes of triodes 216 and 217 are connected to negative conductor 83 through respective cathode resistors 218 and 219. A variable resistor 220 is connected between the cathodes of the two tubes. The anode of triode 216 is connected to the control grid of triode 217 through a resistor 222 and a capacitor 223 connected in series relation, and the control grid of triode 217 is connected to conductor 83 through a resistor 224 which is shunted by a capacitor 225. The anode of triode 217 is connected to the control grid of triode 216 through a resistor 226 and a capacitor 227 connected in series relation, and the control grid of triode 216 is connected to negative conductor 83 through a resistor 228 which is shunted by a capacitor 229. The anode of triode 216 is connected to the control grid of a first output amplifying vacuum tube tetrode 231 through a capacitor 232 and the anode of triode 217 is connected to the control grid of a second output amplifying vacuum tube tetrode 233 through a capacitor 234. A pair of resistors 236 and 237 are connected in series relation between the control grids of tetrodes 231 and 233 and the junction between said resistors is connected to the cathodes of both tetrodes and to negative conductor 83. The anodes of tetrodes 231 and 233 are connected to the respective end terminals of the primary winding 238 of an output transformer 239, the center tap of winding 238 being connected to positive conductor 82 and to the screen grids of tetrodes 231 and 233. A capacitor 240 is connected between the anodes of the two tetrodes. The end terminals of the secondary winding 241 of transformer 239 constitute output terminals $i$ and $j$ of oscillator 155. Oscillator output terminals $k$ and $l$ and oscillator output terminals $m$ and $n$ are provided by respective amplifier units 243 and 244, each of which contains circuit components corresponding to those illustrated within the dotted area 245.

In one specific example of the logging apparatus of this invention the oscillator illustrated in Figure 10 is adapted to provide a fundamental frequency of approximately 1,000 cycles per second and several harmonics thereof. Transformer winding 238 and capacitor 240 form a tuned circuit which is adapted to pass a preselected harmonic of the fundamental signal, which can be the tenth harmonic, for example. The amplifier unit 243 contains an output tuned circuit corresponding to winding 238 and capacitor 240 but which is tuned to pass a second predetermined harmonic of the fundamental, which can be the eighth harmonic, for example. The amplifier unit 244 also contains a tuned circuit corresponding to winding 238 and capacitor 240 but which is tuned to pass a third predetermined harmonic of the fundamental, which can be the sixth harmonic, for example. Output terminals $m$ and $n$ thus provide a frequency signal of 6,000 cycles per second, output terminals $k$ and $l$ provide a frequency signal of 8,000 cycles per second and output terminals $i$ and $j$ provide a frequency signal of 10,000 cycles per second. Accordingly, the reactor output signals which represent the two described current flows and the voltage across the electrodes are of different frequency so as to be readily measurable transmitted over a single pair of conductors to the indicating equipment positioned at the surface.

The operation of the downhole circuitry thus far described can be explained in the following manner: Switches 89 and 90 are operated in unison by relay drive oscillator 98 to convert the direct voltage current source into a square wave alternating potential which is applied across the electrodes. The purpose of the alternating potential is to prevent polarization. Switches 118 and 122 are employed to convert the pulsating potential back to a direct potential for measurement purposes. With these four switches in the positions illustrated the current flow through the various electrodes can be traced somewhat as follows: Current passes from conductor 82 through terminal 87, switch arm 94, switch arm 101 and lead 104 to electrodes 41 and 43. Current also flows from conductor 82 through reactor windings 137 and 135, switch 123 and switch arm 119 to electrode 38. Still a third path of current flow is from conductor 82 through reactor windings 131 and 128, switch 118 and switch arm 115 to electrodes 36 and 37. The total current flow outward from electrodes 41, 36, 37, 38 and 43 passes through the surrounding earth formations and returns to electrodes 40, 35 and 42. From these latter electrodes the current returns to negative conductor 83 through switch arm 107 and switch arm 95. During the alternate half cycle of relay operation the arms of switches 89, 90, 118 and 123 are in the opposite positions, that is, to the right in the illustrated embodiment. At this time the current flow from positive conductor 82 can be traced through terminal 88, switch arm 95 and switch arm 107 to electrodes 40, 35 and 42. This current then flows through the surrounding earth formations and is intercepted by electrodes 41, 36, 37, 38, and 43. The current intercepted by electrodes 41 and 43 returns to negative conductor 83 through switch arms 101 and 94, the latter being in engagement with terminal 92. The current intercepted by electrode 38 passes through switch arm 119 and switch arm 122 to terminal 150 and thence through windings 151 and 152 back to negative conductor 83. The current intercepted by electrodes 36 and 37 passes through switch arms 115 and 117 to terminal 140 and thence through windings 141 and 142 back to negative conductor 83.

As previously mentioned an exciter voltage of 8,000 cycles per second is applied to windings 158 and 159 of respective reactors 136 and 138. Windings 158 and 159 are mounted in opposite directions on the respective reactors so that the fluxes created by current flow through these two windings normally balance one another whereby no output voltage is applied to transformer 168 from windings 165 and 166. However, current flow through windings 135 and 137 during the first half cycle of relay operation and through windings 151 and 152 during the second half cycle results in an unbalance of the flux in cores 138 and 136 such that an output signal is generated. The magnitude of this output signal is proportional to the current flow through windings 135, 137, 151 and 152. Windings 135 and 137 are mounted in relation to windings 151 and 152 such that the flux set up by current flow through either pair of windings is in the same direction in each reactor. Thus, switch 123 functions to convert the alternating current flow across the electrodes into a direct current flow for modulation purposes. The coupling circuit connecting transformer 168 and tetrode 179 is tuned to pass signals of frequency corresponding to the frequency of voltage applied across terminal k and l, that is 8,000 cycles per second in the specific example previously mentioned. The circuit associated with reactors 130 and 132 functions in exactly the same manner except that the output coupling circuit is tuned to pass signals of 10,000 cycles per second.

As previously mentioned reactors 185 and 187 are employed to measure the voltage across the opposing electrodes. A 6,000 cycle per second exciting signal is applied to windings 188 and 189 which are connected in opposition on the respective reactors 187 and 185. Windings 184 and 186 are connected through inductor 183 directly across the opposing electrodes such that the current flow through windings 184 and 186 is representative of the voltage across the electrodes. This current flow results in an output voltage which is proportional to the voltage across the electrodes. The coupling circuit interconnecting transformer 194 and tetrode 193 is tuned to pass frequencies of 6,000 cycles per second. Accordingly, the outputs of the three tetrodes provide signals of different frequency which are representative of the current flows between the split electrodes and the voltage drop thereacross. These signals are superimposed and transmitted to the surface over conductors 82 and 83. Inductors 85 and 183 prevent these output signals from interacting with the measured current flows.

Figure 11:
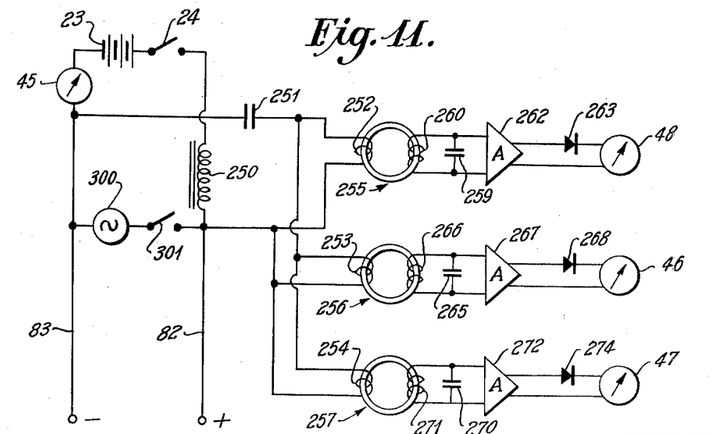
Figure 11 is a schematic circuit diagram of the equipment positioned at the surface of the bore hole.

The surface indicating equipment is illustrated schematically in Figure 11. As previously mentioned the downhole equipment is energized by a source of direct current 23 which is applied across conductors 82 and 83 through a switch 24. An inductor 250 is connected in series with conductor 82 and a current meter 45 is connected in conductor 83 to measure the total current flow to the downhole equipment, and thus the total current flow between the opposing electrodes. The magnitude of the pulsating signals transmitted from the downhole equipment to the surface are recorded at the surface by a plurality of circuits coupled across conductors 82 and 83. Negative conductor 83 is connected through a capacitor 251 to corresponding first end terminals of windings 252, 253, and 254 on respective transformers 255, 256 and 257. The respective second end terminals of transformer windings 252, 253 and 254 are connected to positive conductor 82. Inductor 250 functions to prevent the alternating signals transmitted from the downhole equipment from flowing into voltage source 24 while capacitor 251 prevents direct current flow from voltage source 24 into windings 252, 253 and 254.

A capacitor 259 is connected in shunt with the secondary winding 260 of transformer 255 to form a tuned circuit therewith, the end terminals of which are connected to the input terminals of an amplifier 262. The output terminals of amplifier 262 are connected in circuit with a rectifier 263 and meter 48 which provides a first trace on recorder chart 30. The circuit comprising capacitor 259 and transformer winding 260 is tuned to transmit frequencies of 6,000 cycles per second such that the signal recorded by meter 48 is representative of the voltage across the opposing electrodes. A capacitor 265 is connected in shunt with the secondary winding 266 of transformer 256 to form a tuned circuit therewith, the end terminals of which are connected to the input terminals of an amplifier 267. The output terminals of amplifier 267 are connected in circuit with a rectifier 268 and meter 46 which provides a second trace on recorder chart 30. The circuit comprising capacitor 265 and transformer winding 266 is tuned to transmit frequencies of 8,000 cycles per second such that the signal recorded by meter 46 is representative of the current flow between electrodes 38 and 35. A capacitor 270 is connected in shunt with the secondary winding 271 of transformer 257 to form a tuned circuit therewith, the end terminals of which are connected to the input terminals of an amplifier 272. The output terminals of amplifier 272 are connected in circuit with a rectifier 274 and meter 47 which provides a third trace on recorder chart 30. The tuned circuit comprising capacitor 270 and transformer winding 271 is tuned to transmit frequencies of 10,000 cycles per second such that the signal recorded by meter 47 is representative of the total current flow between electrodes 36 and 37 and electrode 35. Current meter 45 provides a fourth trace on recorder chart 30 which is representative of the total current flow between the various spaced electrodes.

It should thus be apparent that the four traces recorded on chart 30 provide measurements of the voltage across the opposing electrodes, the total current flow between the opposing electrodes and the individual current flows between the center segmented opposing electrodes. From these recorded values it is possible to determine the resistivity of the various formations and to correct the calculated resistivities for the resistivity of the drilling mud and mud invasion zone in the vicinity of the bore hole. These resistivity quantities conveniently are calculated in terms of the reciprocals thereof, that is, the conductance of the various formations. The quantities of interest are the total conductance which is the ratio of the total current as indicated by meter 45 to the voltage across the electrodes which is indicated by meter 48. This total conductance is compared with the ratio of the conductances across selected electrodes as determined by the ratios of current meter readings 46 and 47 to voltage meter reading 45. It should be apparent that these ratios can be obtained directly if desired by means of ratio meters which record the ratios of the two quantities directly on chart 30. While this logging system has been described in conjunction with three split current electrodes 36, 37 and 38 it should readily be apparent that other electrode groupings can be employed if desired. If a larger number of electrodes are employed additional saturable core reactor circuits also are provided. It further should be apparent that the oscillator frequencies and electrode dimensions defined herein are illustrative of present preferred embodiments of this invention and that the invention is not restricted thereto. The various transformers illustrated are constructed of torroidal cores in order to save space in the downhole equipment. Obviously other types of transformers can be utilized if desired.

A test circuit is incorporated in the apparatus of this invention in order to provide an indication of the proper functioning of the downhole circuitry without removing the assembly from the bore hole. To this end a bridge circuit 280 having four resistors 281, 282, 283 and 284 connected therein is mounted within housing 14. A lead 285 is connected between a second terminal 286 of switch 102 and the junction between resistors 281 and 284; a lead 287 is connected between a terminal 288 of switch 102 and the junction between resistors 281 and 282; a lead 290 is connected between a terminal 291 of switch 102 and the junction between resistors 282 and 283; and a lead 293 is connected between a terminal 294 of switch 102 and the junction between resistors 283 and 284. Switch 102 is actuated by a relay coil 295 such that switch arms 107, 101, 119 and 115 engage respective terminals 286, 288, 291 and 294 when coil 295 is energized. One end terminal of relay 295 is connected to conductor 82 and the second end terminal of coil 295 is connected to conductor 83 through the contacts of a vibrating reed relay 296 having its coil connected across conductors 82 and 83. A capacitor 297 and a resistor 298 are connected in series relation with one another and in shunt with relay coil 295. Relay 296 is tuned so as to vibrate at a predetermined frequency which can be 60 cycles per second, for example. A source of alternating potential 300 is positioned at the surface, see Figure 11, and connected across conductors 82 and 83 through a switch 301. Closure of switch 301 applies the voltage from source 300 across the coil of relay 296 which causes the reed thereof to vibrate to close the contacts momentarily during each cycle of applied voltage. This closure of the contacts of relay 296 allows current to flow through relay coil 295 so as to actuate switch 102 to move the switch arms 107, 101, 119 and 115 to the second-mentioned down positions thereby connecting bridge circuit 280 across conductors 82 and 83. Capacitor 297 is charged by current flow through the contacts of relay 296 so that relay 295 remains energized as long as switch 301 remains closed. With relay 295 energized so that the switch arms of switch 102 are in the second-mentioned positions it should be apparent that a constant voltage across bridge 280 is applied at all times to the two saturable core reactor circuits which measure the current flow through the split electrode assembly. Thus the proper functioning of the downhole electrical equipment can readily be observed.

While this invention has been described in conjunction with a present preferred embodiment thereof it obviously should be apparent that the invention is not limited thereto.

What is claimed is:

1. Electrical well logging apparatus comprising, an electrode assembly adapted to be lowered into a bore hole, said assembly comprising first and second opposing elongated electrodes separated from one another by an electrically insulating core, third and fourth opposing elongated electrodes separated from one another by an electrically insulating core, said third and fourth electrodes being spaced from said first and second electrodes, a fifth electrode and a plurality of sixth electrodes separated from one another by an electrically insulating core; means for suspending said assembly within a bore hole so that said first and second electrodes are positioned above said fifth and sixth electrodes and said third and fourth electrodes are positioned below said fifth and sixth electrodes, the groups of said first and second, third and fourth, and fifth and sixth electrodes being positioned in substantially vertical alignment, said fifth and sixth electrodes being closely spaced both to said first and second electrodes and to said third and fourth electrodes; a source of electrical potential, means for applying one terminal of said source of electrical potential to said first, third and fifth electrodes, and means for applying the second terminal of said source of electrical potential to said second, fourth and sixth electrodes so that a first current path is established between said first and second electrodes, a second current path is established between said second and said fourth electrodes, and a plurality of third current paths is established between said fifth and said sixth electrodes, said first, second, and third current paths being through any fluids within the bore hole surrounding said assembly and the earth formations adjacent said assembly, said first, second, third and fourth electrodes serving as guard electrodes so that said third current paths lie in substantially a horizontal plane.

2. Electrical well logging apparatus comprising an electrode assembly adapted to be lowered into a bore hole, said assembly comprising first and second opposing elongated electrodes, said first and second electrodes being of substantially semicircular cross-section and positioned with respect to one another so that said pair of first and second electrodes is of substantially circular cross-section, third and fourth opposing elongated electrodes, said third and fourth electrodes being of substantially semicircular cross-section and positioned with respect to one another so that said pair of third and fourth electrodes is of substantially circular cross-section, a fifth electrode of substantially semicircular cross-section, a plurality of sixth electrodes positioned with respect to one another so that said plurality of sixth electrodes is of substantially semicircular cross-section, said sixth electrodes being positioned with respect to said fifth electrode so that the group of said fifth and sixth electrodes is of substantially circular cross section; means for suspending said assembly within a bore hole so that said first and second electrodes are positioned above said fifth and sixth electrodes, and said third and fourth electrodes are positioned below said fifth and sixth electrodes, the groups of said first and second, third and fourth, and fifth and sixth electrodes being positioned in substantially vertical alignment so that said entire assembly is of substantially circular cross section; a source of electrical potential, means for applying one terminal of said source of electrical potential to said first, third and fifth electrodes, and means for applying the second terminal of said source of electrical potential to said second, fourth and sixth electrodes so that a first current path is established between said first and second electrodes, a second current path is established between said second and said fourth electrodes, and a plurality of third current paths are established between said fifth and said sixth electrodes, said first, second, and third current paths being through any fluids within the bore hole surrounding said assembly and the earth formations adjacent said assembly, said first, second, third and fourth electrodes serving as guard electrodes so that said third current paths lie in substantially a horizontal plane.

3. The combination in accordance with claim 2 wherein the circular cross-sections of the groups of said first and second, said third and fourth, and said fifth and sixth electrodes are of substantially equal diameter, said electrodes being positioned with respect to one another so that said first, third, and fifth electrodes are in substantially vertical alignment and said plurality of sixth electrodes is in substantially vertical alignment with both said second and said fourth electrodes.

4. Electrical well logging apparatus comprising an electrode assembly adapted to be lowered into a bore hole, said assembly comprising first and second opposing elongated electrodes, said first and second electrodes being of substantially semicircular cross-section and positioned with respect to one another so that said pair of first and second electrodes is of substantially circular cross-section, third and fourth opposing elongated electrodes, said third and fourth electrodes being of substantially semicircular cross-section and positioned with respect to one another so that said pair of third and fourth electrodes is of substantially circular cross-section, fifth and sixth opposing electrodes, said fifth and sixth electrodes being of substantially semicircular cross-section and positioned with respect to one another so that said pair of fifth and sixth electrodes is of substantially circular cross-section; means for suspending said assembly within a bore hole so that said first and second electrodes are positioned above said fifth and sixth electrodes, and said third and fourth electrodes are positioned below said fifth and sixth electrodes, the groups of said first and second, third and fourth, and fifth and sixth electrodes being positioned in substantially vertical alignment so that said entire assembly is of substantially circular cross-section; a source of electrical potential means for applying one terminal of said source of electrical potential to said first, third and fifth electrodes, and means for applying the second terminal of said source of electrical potential to said second, fourth and sixth electrodes so that a first current path is established between said first and second electrodes, a second current path is established between said second and said fourth electrodes, and a third current path is established between said fifth and said sixth electrodes, said first, second, and third current paths being through any fluids within the bore hole surrounding said assembly and the earth formations adjacent said assembly, said first, second, third and fourth electrodes serving as guard electrodes so that said third current paths lie in substantially a horizontal plane.

5. Electrical well logging apparatus comprising an electrode assembly adapted to be lowered into a bore hole comprising a generally cylindrical member of electrically insulating material, a first electrode mounted thereon and enclosing substantially one-half of the surface of said member between two parallel planes positioned perpendicular to the longitudinal axis of said member, said one-half lying on one side of a third plane including the longitudinal axis of said cylinder, and a plurality of second electrodes mounted on the second half of said cylinder, each of said second electrodes extending substantially the entire length of said member between said parallel planes, said second electrodes being spaced from one another and from said first electrode; means for suspending said assembly within a bore hole so that the longitudinal axis of said member is substantially vertical; a source of electrical potential, means for applying one terminal of said source of electrical potential to said first electrode, and means for applying the second terminal of said source of electrical potential to said second electrodes so that a plurality of current paths are established between said first electrode and said second electrodes, said current paths being in substantially a horizontal plane.

6. An electrode assembly for use in electrical well logging comprising a generally cylindrical member of electrically insulating material, a first electrode mounted on said member near the midpoint thereof longitudinally, a plurality of second electrodes mounted on said member near said midpoint opposing said first electrode, said plurality of second electrodes being spaced from one another and from said first electrode, third and fourth opposing electrodes mounted on opposite sides of said member between said first and second electrodes and one end of said member, said third and fourth electrodes being spaced from said first and second electrodes and from one another, and fourth and fifth opposing electrodes mounted on opposite sides of said member between said first and second electrodes and the second end of said member, said fifth and sixth electrodes being spaced from said first and second electrodes and from one another.

7. An electrode assembly for use in electrical well logging comprising a generally cylindrical member of electrically insulating material, a first electrode mounted on said member near the midpoint thereof longitudinally, said first electrode covering substantially one-half of the surface of said member between first and second parallel spaced planes positioned perpendicular to the longitudinal axis of said member, said one-half lying on one side of a third plane including the longitudinal axis of said member, a plurality of second electrodes mounted on said member on the other side of said third plane, said plurality of second electrodes being spaced from one another and from said first electrode, said plurality of electrodes each extending substantially the entire distance from said first plane to said second plane, said plurality of electrodes covering substantially the second half of the surface of said member between said first and second planes, a third elongated electrode mounted on said member in closely spaced relation with said first electrode, said third electrode covering substantially one-half the surface of said member from said first plane to one end of said member, a fourth elongated electrode mounted on said member in closely spaced relation with said plurality of second electrodes, said fourth electrode covering substantially the other one-half of the surface of said member from said first plane to said one end of said member, a fifth elongated electrode mounted on said member in closely spaced relation with said first electrode, said fifth electrode covering substantially one-half the surface of said member from said second plane to the other end of said member, and a sixth elongated electrode mounted on said member in closely spaced relation with said plurality of second electrodes, said sixth electrode covering substantially the other one-half the surface of said member from said second plane to said second end of said member, said first, third, and fifth electrodes lying on one side of said third plane and said second, fourth, and sixth electrodes lying on the opposite side of said third plane.

8. An electrode assembly for use in electrical well logging comprising a generally cylindrical member of electrically insulating material, a first electrode mounted on said member at substantially the midpoint thereof between first and second parallel spaced planes each positioned perpendicular to the longitudinal axis of said member, said first electrode having substantially a semicircular cross-section in a plane taken perpendicular to the longitudinal axis of said member, the axis of said semicircular cross-section of said first electrode being coaxial with the axis of said cylindrical member, a plurality of second electrodes mounted on said member, each of said second electrodes extending between said first and second planes, said plurality of second electrodes being spaced from one another and from said first electrode, said plurality of second electrodes forming a semicircular path in a plane perpendicular to the axis of said member, the axis of said semicircular path being coaxial with the axis of said cylindrical member, third and fourth opposing electrodes mounted on said member between said first plane and one end of said member, said third and fourth electrodes each having substantially a semicircular cross-section in a plane taken perpendicular to the axis of said member, the axes of said third and fourth electrode cross-sections being coaxial with the axis of said member, and fifth and sixth opposing electrodes mounted on said member between said second plane and the second end of said member, said fifth and sixth electrodes each having a semicircular cross-section in a plane taken perpendicular to the axis of said member, the axes of said fifth and sixth cross-sections being coaxial with the axis of said member, the radii of curvatures of each of said semicircular cross-sections being substantially equal.

9. The combination in accordance with claim 8 wherein said first, third, and fifth electrodes lie on the first side of a plane containing the axis of said cylindrical member and said second, fourth, and sixth electrodes lie on the opposite side of said plane, and further comprising a pair of fins of electrically insulating material positioned between said first electrode and said plurality of second electrodes, said fins extending outwardly from said member in close proximity to the wall of the bore hole being logged.

10. An electrode assembly for use in electrical well logging comprising a generally cylindrical hollow core member, an annular electrically insulating support member mounted on said core member near the midpoint thereof longitudinally, a first electrode mounted on said annular member, a plurality of second electrodes mounted on said annular member opposing said first electrode, said second electrodes being spaced from one another and from said first electrode, a first generally cylindrical hollow electrically insulating support member positioned about said core member between said annular member and one end of said core member, third and fourth opposing electrodes mounted on said first support member, said third and fourth electrodes being spaced from one another and from said first and second electrodes, a second generally cylindrical hollow electrically insulating support member positioned about said core member between said annular member and one end of said core member, and fifth and sixth opposing electrodes mounted on said second support member, said fifth and sixth electrodes being spaced from one another and from said first and second electrodes.

11. The combination in accordance with claim 10 wherein said support members each are spaced from said core member, and further comprising means to fill the annular regions between said core member and said support members with an electrically insulating liquid.

12. Electrical well logging apparatus comprising an electrode assembly adapted to be lowered into a bore hole, said assembly comprising first and second opposing elongated electrodes, said first and second electrodes being of substantially semicircular cross-section and positioned with respect to one another so that said pair of first and second electrodes is of substantially circular cross-section, third and fourth opposing elongated electrodes, said third and fourth electrodes being of substantially semicircular cross-section and positioned with respect to one another so that said pair of third and fourth electrodes is of substantially circular cross-section, a fifth electrode of substantially semicircular cross-section, a plurality of sixth electrodes positioned with respect to one another so that said plurality of sixth electrodes is of substantially semicircular cross-section, said sixth electrodes being positioned with respect to said fifth electrode so that the group of said fifth and sixth electrodes is of substantially circular cross section; means for suspending said assembly within a bore hole so that said first and second electrodes are positioned above said fifth and sixth electrodes and said third and fourth electrodes are positioned below said fifth and sixth electrodes, the groups of said first and second, third and fourth, and fifth and sixth electrodes being positioned in substantially vertical alignment so that said entire assembly is of substantially circular cross section; a source of electrical potential, means for applying one terminal of said source of electrical potential to said first, third and fifth electrodes, and means for applying the second terminal of said source of electrical potential to said second, fourth and sixth electrodes so that a first current path is established between said first and second electrodes, a second current path is established between said second and fourth electrodes, and a plurality of third current paths are established between said fifth and said sixth electrodes, said first, second, and third current paths being through any fluids within the bore hole surrounding said assembly and the earth formations adjacent said assembly, said first, second, third and fourth electrodes serving as guard electrodes so that said third current paths lie in substantially a horizontal plane; means to measure the magnitude of current flow in said first, second, and third paths; and means to measure the difference between said first and second potentials.

13. Electrical well logging apparatus comprising an electrode assembly adapted to be lowered into a bore hole, said assembly comprising first and second opposing elongated electrodes, said first and second electrodes being of substantially semicircular cross-section and positioned with respect to one another so that said pair of first and second electrodes is of substantially circular cross-section, third and fourth opposing elongated electrodes, said third and fourth electrodes being of substantially semicircular cross-section and positioned with respect to one another so that said pair of third and fourth electrodes is of substantially circular cross-section, a fifth electrode of substantially semicircular cross-section, a plurality of sixth electrodes positioned with respect to one another so that said plurality of sixth electrodes is of substantially semicircular cross-section, said sixth electrodes being positioned with respect to said fifth electrode so that the group of said fifth and sixth electrodes is of substantially circular cross section; means for suspending said assembly within a bore hole so that said first and second electrodes are positioned above said fifth and sixth electrodes and said third and fourth electrodes are positioned below said fifth and sixth electrodes, the groups of said first and second, third and fourth, and fifth and sixth electrodes being positioned in substantially vertical alignment so that said entire assembly is of substantially circular cross section; a source of electrical potential, means for applying one terminal of said source of electrical potential to said first, third and fifth electrodes, and means for applying the second terminal of said source of electrical potential to said second, fourth and sixth electrodes so that a first current path is established between said first and second electrodes, a second current path is established between said second and said fourth electrodes, and a plurality of third current paths are established between said fifth and said sixth electrodes, said first, second, and third current paths being through any fluids within the bore hole surrounding said assembly and the earth formations adjacent said assembly, said first, second, third and fourth electrodes serving as guard electrodes so that said third current paths lie in substantially a horizontal plane; and means for measuring at the surface of the bore hole the magnitude of current flows in said first, second, and third paths and the difference between said first and second potentials comprising a plurality of signal transmitters positioned within the bore hole in close proximity to said assembly, means to energize respective ones of said transmitters in accordance with the magnitude of each of the current flows to be measured, means to energize another one of said transmitters in accordance with the difference between said first and second potentials, means positioned at the surface of the bore hole to measure the outputs of said transmitters, and means to transmit the output of said transmitters to said means positioned at the surface of the bore hole.

14. The combination in accordance with claim 13 wherein each of said signal transmitters comprises a core of magnetic material having a first winding thereon, means for applying an alternating signal of predetermined frequency to said first winding, a second winding on said core, a third winding on said core, means to transmit the voltages induced in said third winding to the surface of the bore hole, and means to apply a signal to said second winding of magnitude proportional to the quantity to be transmitted so that a signal is induced in said third winding which is proportional in magnitude to the signal applied to said second winding, the signal induced in said third winding being of the same frequency as the alternating signal applied to said first winding.

15. Electrical well logging apparatus comprising an electrode assembly adapted to be lowered into a bore hole, said assembly comprising first and second opposing elongated electrodes, said first and second electrodes being of substantially semicircular cross-section and positioned with respect to one another so that said pair of first and second electrodes is of substantially circular cross-section, third and fourth opposing elongated electrodes, said third and fourth electrodes being of substantially semicircular cross-section and positioned with respect to one another so that said pair of third and fourth electrodes is of substantially circular cross-section, a fifth electrode of substantially semicircular cross-section, a plurality of sixth electrodes positioned with respect to one another so that said plurality of sixth electrodes is of substantially semicircular cross-section, said sixth electrodes being positioned with respect to said fifth electrodes so that the group of said fifth and sixth electrodes is of substantially circular cross section; means for suspending said assembly within a bore hole so that said first and second electrodes are positioned above said fifth and sixth electrodes and said third and fourth electrodes are positioned below said fifth and sixth electrodes, the groups of said first and second, third and fourth, and fifth and sixth electrodes being positioned in substantially vertical alignment so that said entire assembly is of substantially circular cross section; a source of direct electrical potential, means for applying one terminal of said source of direct electrical potential to said first, third and fifth electrodes, and means for applying the second terminal of said source of direct electrical potential to said second, fourth and sixth electrodes so that a first current path is established between said first and second electrodes, a second current path is established between said second and said fourth electrodes, and a plurality of third current paths are established between said fifth and said sixth electrodes, said first, second, and third current paths being through any fluids within the bore hole surrounding said assembly and the earth formations adjacent said assembly, said first, second, third and fourth electrodes serving as guard electrodes so that said third current paths lie in substantially a horizontal plane; and means adapted to be positioned within the bore hole to measure each of said current flows and the difference between said first and second potentials comprising a plurality of pairs of cores of magnetic material, there being one pair of cores for each of said current flows to be measured and one pair of cores for the difference in said potentials to be measured, an output winding mounted on each of said cores, the two output windings of each pair of cores being connected in series relation, a control winding mounted on each of said cores, the two control windings of each pair of cores being connected in series relation, means for applying said current flows to respective pairs of said control windings, means for applying said potential difference across the remaining pair of said control windings, an exciter winding mounted on each of said cores, the two exciter windings of each pair of cores being connected in series relation but wound on the respective cores in each of said pairs in opposite directions, and a source of alternating potential of predetermined frequency applied to the exciter windings of each pair of cores, there being no signal induced in the output windings by a signal applied to the exciter windings in the absence of a signal being applied to said control windings, there being a signal induced in said output windings proportional in magnitude to any signal applied to said respective control windings, said output signals being of the same frequency as the respective signals applied to said exciter windings, there being a different frequency applied to each pair of exciter windings.

16. The combination in accordance with claim 15 further comprising means adapted to be positioned at the surface of the bore hole comprising a plurality of tuned circuits, each tuned to pass a respective one of the frequencies applied to said exciter windings, and means to measure the magnitudes of each of the frequencies passed by said tuned circuits.

17. The combination in accordance with claim 15 wherein said source of direct electrical potential is positioned at the surface of the bore hole, first switching means associated with said assembly for reversing the polarities of said first and second terminals at a predetermined frequency, and second switching means associated with said assembly for applying said current flows alternately through each of said control windings of each of said respective pairs of cores at said predetermined frequency so that unidirectional currents are applied to said control windings.

18. The combination in accordance with claim 17 wherein said switching means comprise an oscillator providing an output of said predetermined frequency, a plurality of relay operated switches, and means for applying the output of said oscillator to the relay coils of each of said switches.

19. The combination in accordance with claim 15 further comprising a voltage dividing network associated with said assembly, and means for selectively applying said first and second terminals across said network and for applying said control windings across selected portions of said network so that predetermined potentials are applied across said control windings.

20. The combination in accordance with claim 19 wherein said means for applying said potentials and windings comprises relay operated switching means, said switching means being energized by a tuned relay, and means for selectively applying a signal to said relay of the frequency to which said relay is tuned.

References Cited in the file of this patent
UNITED STATES PATENTS

| | | |
|---|---|---|
| 2,379,996 | Silverman | July 10, 1945 |
| 2,398,761 | Aiken | Apr. 23, 1946 |
| 2,436,563 | Frosch | Feb. 24, 1948 |
| 2,501,953 | Martin | Mar. 28, 1950 |
| 2,568,241 | Martin | Sept. 18, 1951 |
| 2,653,294 | McMillan | Sept. 22, 1953 |
| 2,654,064 | Broding | Sept. 29, 1953 |
| 2,667,626 | Blancher | Jan. 26, 1954 |